A. T. DAWSON & G. T. BUCKHAM.
FIRING MECHANISM FOR BREECH LOADING ORDNANCE.
APPLICATION FILED JAN. 5, 1905.

922,268.

Patented May 18, 1909.

A. T. DAWSON & G. T. BUCKHAM.
FIRING MECHANISM FOR BREECH LOADING ORDNANCE.
APPLICATION FILED JAN. 5, 1905.

922,268.

Patented May 18, 1909.
10 SHEETS—SHEET 3.

A. T. DAWSON & G. T. BUCKHAM.
FIRING MECHANISM FOR BREECH LOADING ORDNANCE.
APPLICATION FILED JAN. 5, 1905.

922,268.

Patented May 18, 1909.
10 SHEETS—SHEET 4.

A. T. DAWSON & G. T. BUCKHAM.
FIRING MECHANISM FOR BREECH LOADING ORDNANCE.
APPLICATION FILED JAN. 5, 1905.

922,268.

Patented May 18, 1909.
10 SHEETS—SHEET 6.

Witnesses.

Inventors.
Arthur T. Dawson,
George T. Buckham,
By James L. Norris
Atty.

A. T. DAWSON & G. T. BUCKHAM.
FIRING MECHANISM FOR BREECH LOADING ORDNANCE.
APPLICATION FILED JAN. 5, 1905.

922,268.

Patented May 18, 1909.
10 SHEETS—SHEET 8.

A. T. DAWSON & G. T. BUCKHAM.
FIRING MECHANISM FOR BREECH LOADING ORDNANCE.
APPLICATION FILED JAN. 5, 1905.

922,268.

Patented May 18, 1909.
10 SHEETS—SHEET 9.

A. T. DAWSON & G. T. BUCKHAM.
FIRING MECHANISM FOR BREECH LOADING ORDNANCE.
APPLICATION FILED JAN. 5, 1905.

922,268.

Patented May 18, 1909.
10 SHEETS—SHEET 10.

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS SONS & MAXIM LIMITED, OF WESTMINSTER, ENGLAND.

FIRING MECHANISM FOR BREECH-LOADING ORDNANCE.

No. 922,268.          Specification of Letters Patent.          Patented May 18, 1909.

Application filed January 5, 1905. Serial No. 239,779.

*To all whom it may concern:*

Be it known that we, ARTHUR TREVOR DAWSON, lieutenant of the Royal Navy, director and superintendent of Ordnance Works, and GEORGE THOMAS BUCKHAM, engineer, both subjects of the King of Great Britain, residing at 32 Victoria street, Westminster, in the county of London, England, have invented certain new and useful Improvements Relating to Firing Mechanism for Breech-Loading Ordnance, of which the following is a specification.

This invention comprises the application of a firing lock of the "magazine rifle" type or pattern to breech loading ordnance in place of the ordinary percussion or electric lock, so that an ordinary rifle cartridge (without its bullet) may be used as a percussion primer. The chief advantage thus obtained is that interchangeability is permitted between the cartridges for magazine rifles and the primers used for breech loading guns, the former being almost unfailing in respect of certainty of fire so that their use greatly diminishes the frequency of misfires. Moreover they are comparatively cheap to manufacture. Another advantage is that when a magazine is used with the lock greater rapidity of fire is obtainable, and another advantage is that the pull-off of the trigger or firing gear is considerably less than is usual with percussion locks of ordinary pattern, so that said trigger or firing sear may be actuated either electrically by means of a small electromagnet or the like; or mechanically by means of comparatively light mechanical devices instead of by the ordinary lanyard pull which is usually so heavy that the gunner's observation of the sight is considerably disturbed when firing. We are of course aware that this latter disadvantage of disturbing the gunner's observation of the sight does not exist in what is ordinarily termed electric firing, but the ordinary electric lock is complicated by reason of the firing pin or needle having to be insulated, and it is also liable to "short circuit."

We may employ with the improved firing mechanism a safety device comprising a sliding safety piece and a safety sear so arranged that the firing of the gun is rendered impossible unless the breech is locked, or should the safety piece be inadvertently displaced or omitted.

When a magazine is used with the improved firing mechanism the cartridges or primers are successively supplied to the lock after the manner of a magazine rifle; but when a magazine is not used, the cartridges or primers are inserted into the lock by hand.

In order that our said invention may be clearly understood and readily carried into effect we will describe the same more fully with reference to the accompanying drawings which illustrate several forms of our improved firing gear applied by way of example to breech mechanism of the kind in which the sliding safety piece works in a slide box connected with the obturator bolt by interrupted threads. The said safety piece is provided with two bolts one of which engages with a cam in the breech actuating hand-lever and the other of which engages with a groove in the bar used for angularly displacing the breech block when the breech actuating hand lever is operated.

Fig. 9 is a side elevation, Fig. 10 a vertical section, and Fig. 11 an end view of the nut and the rearward extension therein forming the breech bolt casing. Fig. 14ª is a detail view of the safety piece and safety sear in combination with the firing mechanism. Figs. 23 and 24 are side elevations of the said mechanism as seen respectively from the right and left of Fig. 21. In Figs. 21, 22 and 24 the gearing for effecting the mechanical firing is clearly shown.

Like characters of reference indicate similar parts in all the figures.

A is the swinging carrier of the breech mechanism and B is the breech block. C the slide box or box nut-frame.

D is the sliding safety piece and $D^1$ $D^2$ are its two bolts.

E is the link of the breech mechanism with which the bolt $D^1$ engages, and F is the breech actuating hand-lever with which the bolt $D^2$ engages. The said link E is connected at one end with a crank arm $E^1$ which is pivoted at $E^\times$ to the carrier A and actuated through gearing $E^\circ$ operated by the hand lever. At the other end, the said link E is connected with the breech block at the point $E^2$, so that when the hand lever F is operated to open and close the breech the said link E moves to and fro to effect the angular displacement of the block for locking and unlocking it to and from the gun.

Figures 9, 10, 11:
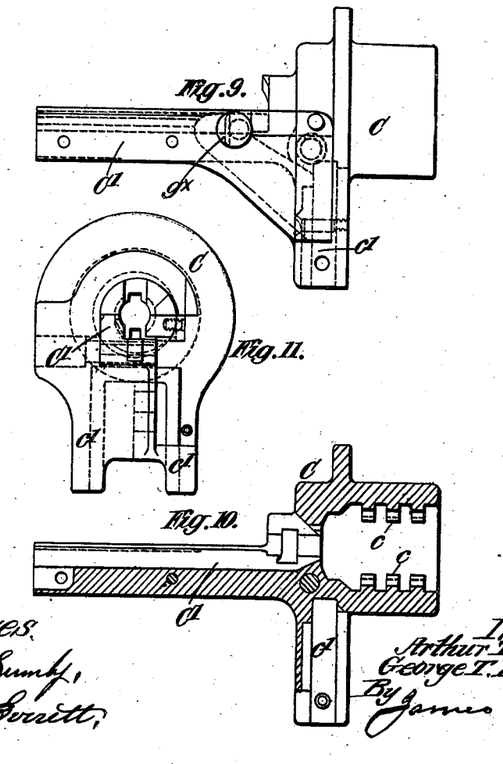

In all of the forms of our improved mechanism herein described the firing pin or striker $g$, is arranged within the breech bolt G which by means of a lateral arm $g^\times$ can be caused to turn and slide to and fro in a frame or bolt casing $C^1$ as in a magazine rifle of the ordinary pattern. The said frame or bolt casing $C^1$ extends from or forms part of the slide box C (Figs. 9, 10 and 11) which is held to the rear end of the mushroom stem H by interrupted collars or screw threads $c$ $c$ on the nut portion of said slide box, in such a manner that a partial turn of the slide box serves to lock it to the mushroom stem after it has been placed in position as is well understood in connection with firing mechanism for breech loading ordnance. The slide box is secured in its locked position and prevented from turning by a forward projection $D^3$ on the aforesaid sliding safety piece D engaging with a vertical groove $a$ in the carrier A, said safety-piece being held between the two vertical sides $c^1$ $c^1$ of the slide box so as to be capable of sliding vertically therein in the usual manner by the action of the breech-actuating hand lever F upon the bolt $D^2$. The said bolt $D^1$ of the sliding safety piece engages with a slot $E^3$ in the adjacent side of the link E so that when the hand lever F is actuated to open the breech and the bolt $D^2$ becomes disengaged from the cam $f$ and hence also from the said hand lever during the outward movement of the latter to the position shown in Fig. 26 the said sliding safety piece will still be supported by said bolt $D^1$ engaging with said slot E in the link E.

Figure 6:
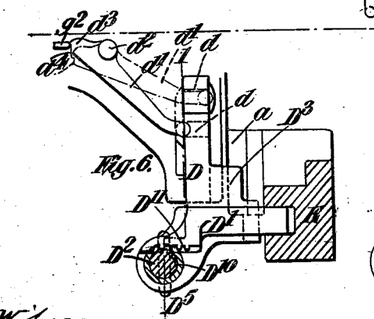
Fig. 6 is a vertical section showing the safety piece and safety sear employed with this form of our firing mechanism.
Figures 7, 8:
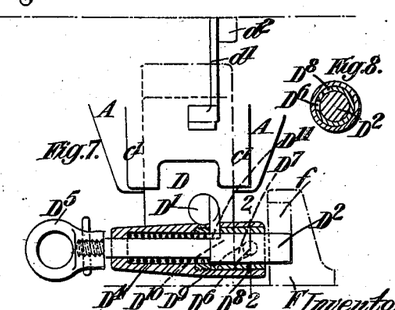
Fig. 7 is a vertical section taken approximately on the line 1. 1. of Fig. 6.
Fig. 8 is a cross section on the line 2. 2. of Fig. 7.

The bolt $D^2$ is provided with a spring $D^4$ (Fig. 7) which keeps it normally in engagement with the cam-groove $f$ of the said hand lever F, the said bolt being withdrawn from such engagement when it is required to detach the sliding safety piece by pulling it rearwardly by means of the eye $D^5$ and then giving it a partial turn. A peg or pin $D^6$ (Figs. 7 and 8) on this bolt engages in a cam groove $D^7$ in the bolt socket $D^8$ of the safety piece D so that after the bolt has been withdrawn and turned as stated, the said peg or pin enters a notch $D^9$ in the end of the said cam-groove whereby the bolt is retained in its rearward or disengaged position as is well understood in connection with similar safety pieces used in other forms of firing mechanism. We preferably arrange the bolt $D^1$ with rack teeth $D^{11}$ (Fig. 6) to engage with teeth $D^{10}$ on the spring bolt $D^2$ (Figs. 6 and 7) so that the act of withdrawing or disengaging the bolt $D^2$ and turning it as aforesaid simultaneously withdraws the bolt $D^1$ from engagement with the link E and thus enables the safety piece to be detached from the lock by a downward movement. These two bolts $D^1$ $D^2$ may however be separately operated.

Figures 1, 4, 14:
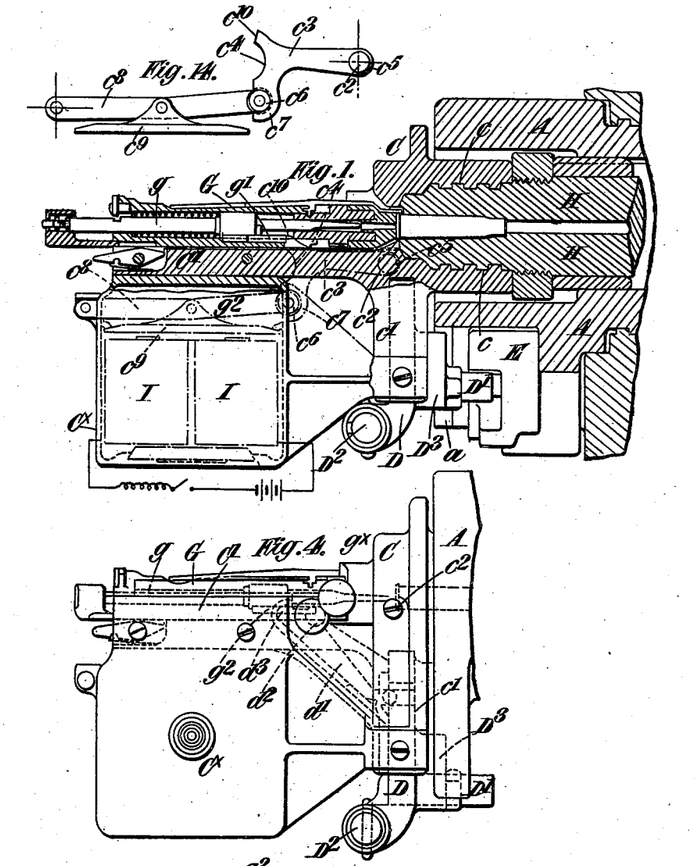
Figure 1 is a longitudinal section, Fig. 2 an end view, and Fig. 3 a plan of one form of the improved firing mechanism adapted to be fired electrically.
Fig. 4 is a side elevation as seen from the right of Fig. 2.
Fig. 14 is a detail view of the sear mechanism for releasing the firing pin.
Figure 2:
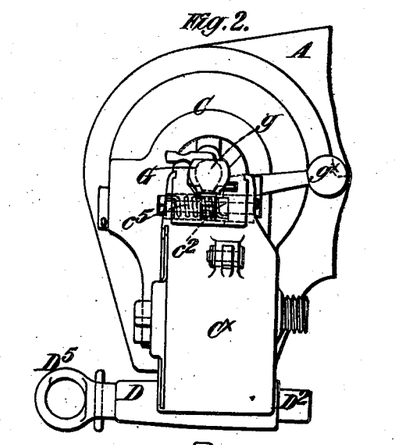
Figure 3:
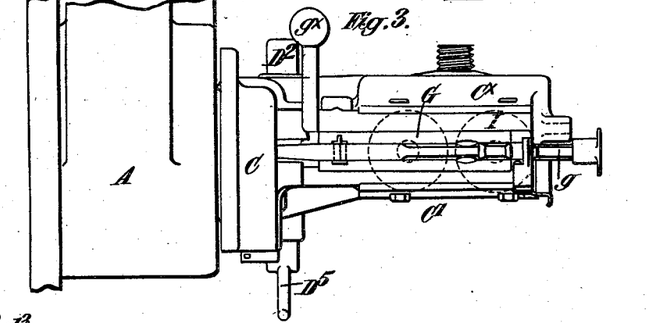
Figure 5:
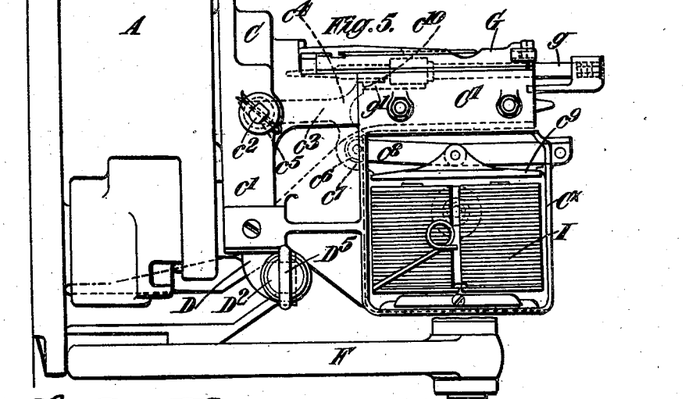
Fig. 5 is a side elevation as seen from the left of Fig. 2 with the cover plate of the electro magnet removed.
Figure 12:
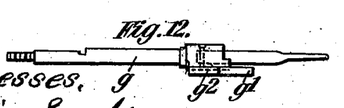
Fig. 12 is a side elevation and Fig. 13 a plan of the firing pin shown separately.
Figure 13:
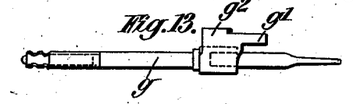
Figure 14A:
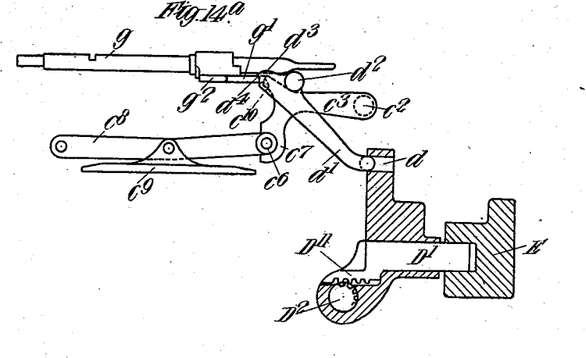

In the arrangement of our improved firing mechanism shown by Figs. 1 to 14, we provide an axle $c^2$ (as best seen in Fig. 14) upon which is mounted an arm $c^3$ having a curved or inclined portion $c^4$ that projects through an opening in the bolt G and its casing $C^1$ and normally tends to move toward the axis of the firing pin under the influence of a spiral spring $c^5$ on the axle $c^2$ (Fig. 2), and to thus bring its nose or sear $c^{10}$ into engagement with a lug $g^1$ of the firing pin $g$ (Figs. 12 and 13). Engaging with the said arm $c^3$ by a roller $c^6$ entering a recessed depending portion $c^7$ of the arm $c^3$ is a pivoted lever $c^8$ carrying an armature $c^9$ that lies in close proximity to the pole pieces of an electromagnet I, inclosed in a casing $C^\times$ forming part of or connected with the bolt casing $C^1$. When the breech bolt G is unlocked and retracted in the act of extracting the expended primer by the aid of the extractor $g^6$, the said arm $c^3$ will first be depressed against the resistance of the spring $c^5$, by the bolt passing over its curved portion $c^4$, and will, as soon as the retraction is completed, regain its original position under the reaction of said spring, thus bringing its nose or sear $c^{10}$ into a position for stopping the advance of the firing pin $g$ when the breech bolt G (after the insertion into the gun of a fresh primer) is returned to its forward and locked position. The said firing pin $g$ thus becomes "cocked" and is held in such position by the sear $c^{10}$ of said arm $c^3$. Upon permitting an electric current to energize the electro-magnet I, however, the armature $c^9$ is attracted and the lever $c^8$ and arm $c^3$ actuated, whereupon the sear $c^{10}$ will be disengaged from the lug $g^1$ and will liberate the firing pin $g$ and the latter will fly forward by the action of its spring and thereby fire the primer.

The safety piece or slide D has a transverse groove or slot $d$ (Figs. 6 and 7 and 14$^a$) in which the tail end of the safety sear $d^1$ engages. This safety sear is fixed on a journal $d^2$ pivoted in the rearward extension of the slide box C at the right of the bolt G, its other end engaging with a projection $g^2$ on the lug $g^1$ of the firing pin or striker $g$.

Figure 25:
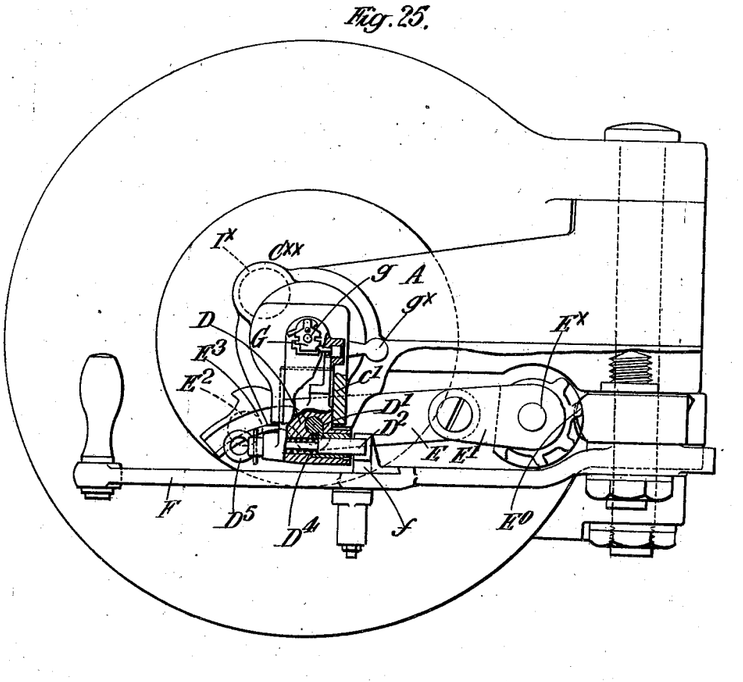
Fig. 25 is an elevation of the breech end of the gun showing the breech-actuating hand lever in its closed position.

While the hand lever is being initially actuated, the cam $f$ exercises a downward force upon the blot $D^2$ and hence upon the whole safety piece, and simultaneously with this action the link E is being drawn across the face of the breech end of the gun. Therefore, as the link E is moving transversely, the bolt $D^1$ which engages in a groove or slot $E^3$ in the link E can move downwardly on account of the downwardly-curving formation of said groove or slot $E^3$ and the downward motion of the link E (see Figs. 25 and 26), consequently on the first movement of the hand lever F to open the breech, the spring bolt $D^2$ is acted upon and forces the safety piece or slide D downward in the guide $c^1$ of the slide box. During this movement, the said safety sear $d^1$ receives a partial rotation on its pivotal axis, the effect of which is to cause it to bring its nose $d^3$ in front of the projection $g^2$ on the lug $g^1$ of the firing pin $g$ and prevent the latter flying forward into contact with the detonator of the cartridge or primer in the gun, should the retaining sear $c^{10}$ be released from the lug $g^1$ of said firing pin while the breech is unlocked.

Figure 26:
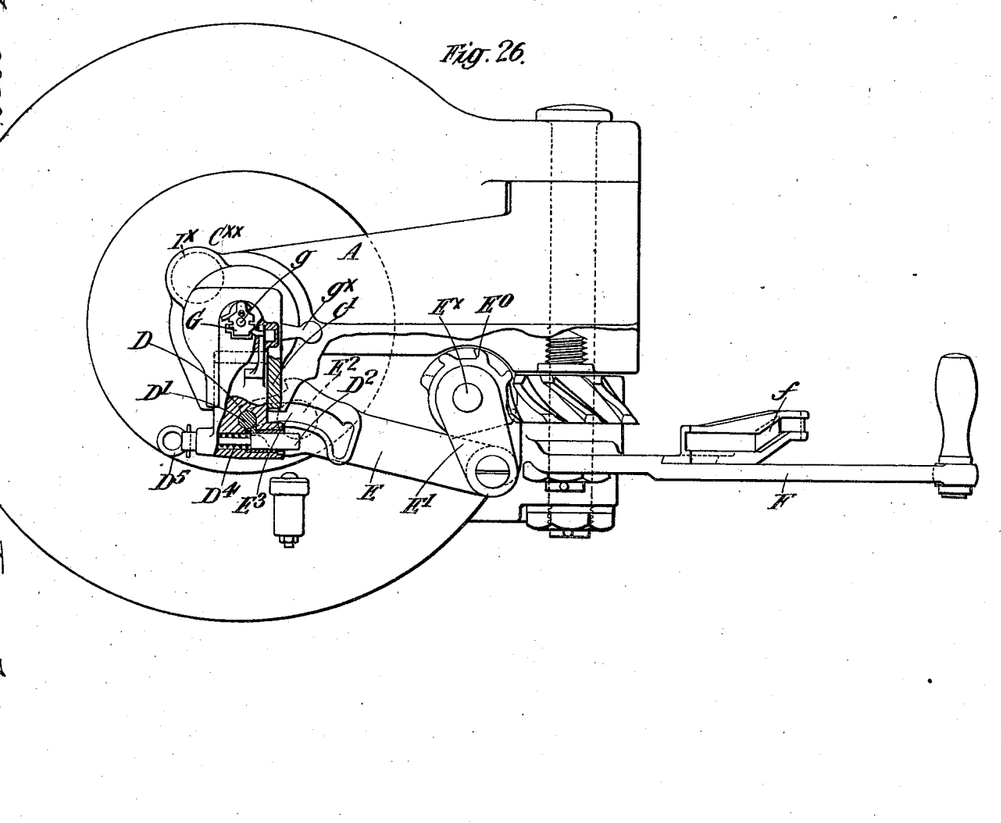
Fig. 26 is a similar view showing said hand lever moved into a position such that the breech block has become unlocked.

In Fig. 26 the hand lever F is shown turned through a sufficient angle to unlock the breech block, and it will be understood that further movement of said hand lever in the same direction will cause the swinging carrier A to be turned upon its hinges away from the gun and open the breech. After the hand lever F has been swung away from the breech, the safety piece D is kept in its correct normal position until the return of the said hand lever by the engagement of the bolt $D^1$ with the groove or slot $E^3$ in the bar E as aforesaid. Should it be desired to withdraw the safety piece D completely from the slide box, the act of such withdrawal will cause the safety sear $d^1$ to turn to a greater extent about its axis than in the above described movement and the tail end of the safety sear will become disconnected from the groove or slot $d$ in the safety piece D and the projection $g^2$ on the lug $g^1$ of the firing pin will become engaged by a notch $d^4$ in the opposite end of the safety sear and cannot then be released until the said safety piece D is replaced in the slide box.

Figure 15:
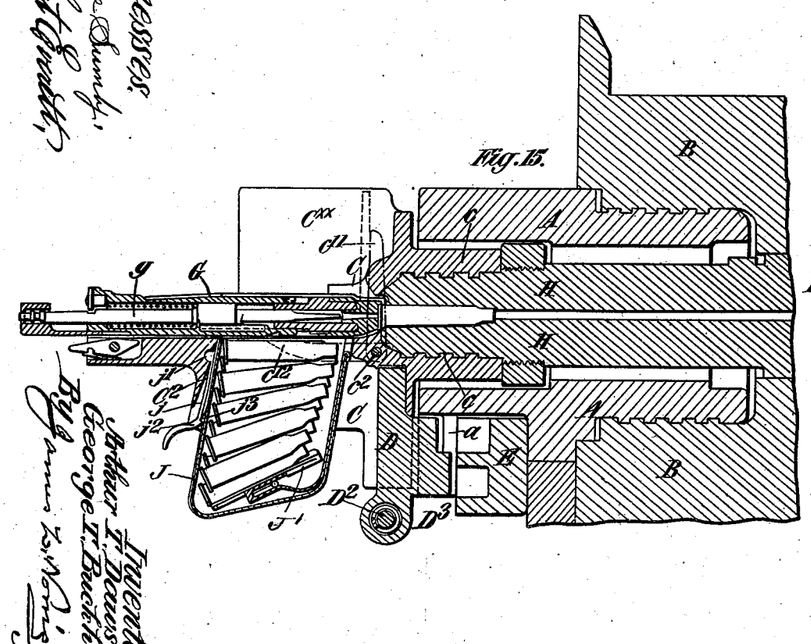
Fig. 15 is a longitudinal section, Fig. 16 an end view, and Fig. 17 a plan of another form of the said mechanism adapted to be fired electrically and provided with a magazine for the cartridges or primers.
Figure 16:
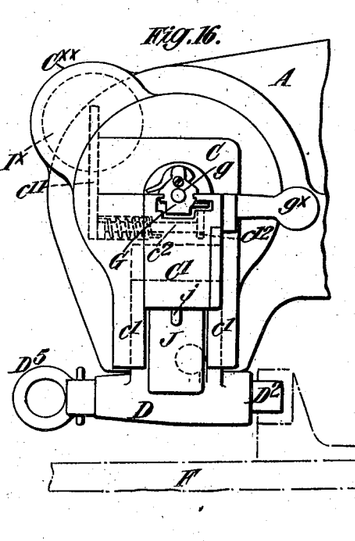
Figure 17:
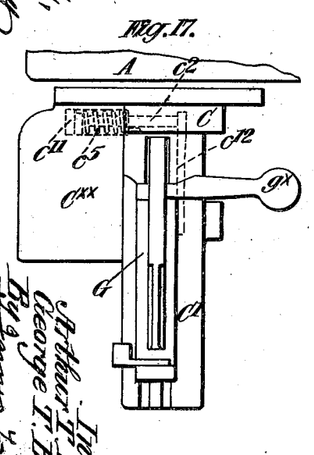
Figure 18:
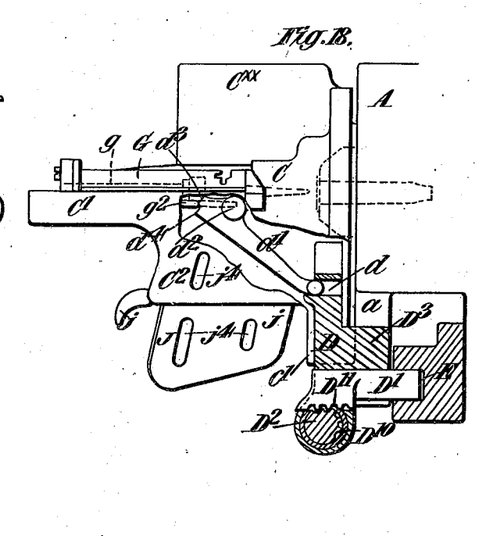
Fig. 18 is a sectional side elevation, and Fig. 19 a sectional end view showing the safety piece and safety sear employed with this form of the mechanism.
Figure 19:
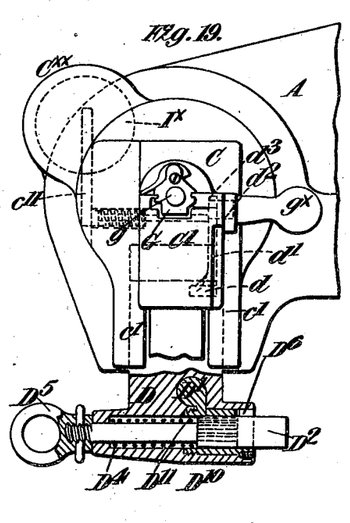
Figure 20:
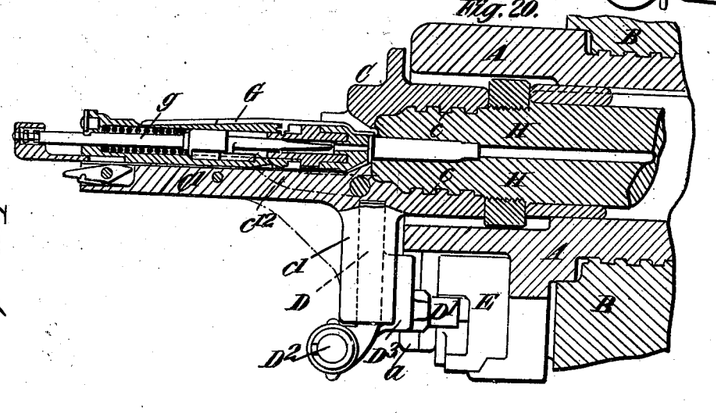
Fig. 20 is a vertical section, Fig. 21 an end view, and Fig. 22 a plan of another form of the said mechanism similar to that illustrated by Figs. 1 to 14, but adapted to be fired mechanically instead of electrically.
Figure 21:
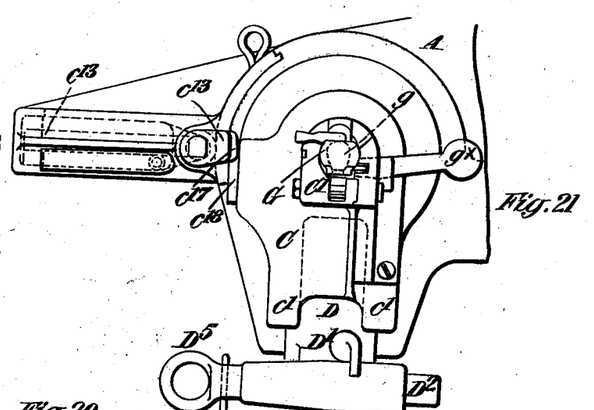
Figure 22:
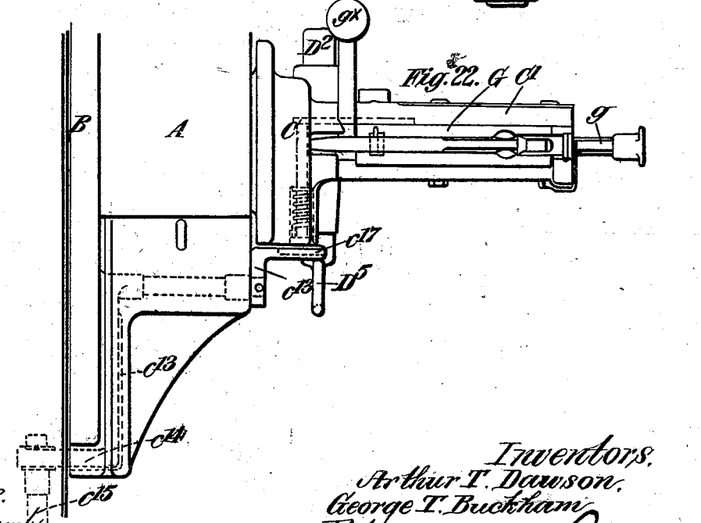
Figure 23:
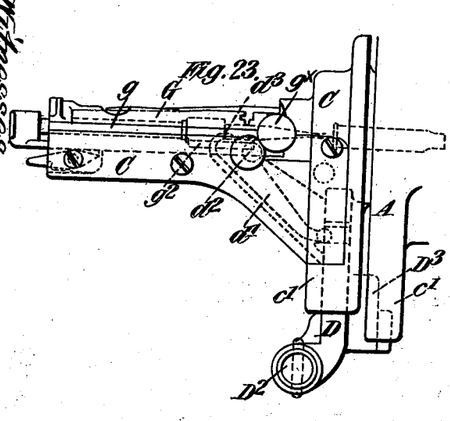

In the arrangement illustrated by Figs. 15 to 19, we have shown the mechanism provided with a primer magazine J in which case the electro magnet $l^\times$ is removed from its position shown in Figs. 1 to 14, and situated above the lock in a casing $C^{\times\times}$ forming part of the box slide. In this case the electromagnet is adapted to actuate an armature carried by an arm $c^{11}$ on the axle $c^2$, said axle being furnished with a finger or sear $c^{12}$ (Figs. 15 and 16) for retaining the firing pin $g$ in its cocked position in an analogous manner to that of the arm $c^3$ in Figs. 1 to 14. When the electro magnet is energized and the arm $c^{11}$ actuated thereby, the firing pin will be liberated and will fly forward to fire the primer as above stated with respect to Figs. 1 to 14. The part of the slide box immediately underneath the bolt casing $C^1$ is in this case formed with a depending socket piece $C^2$ for the reception of the magazine which can be quickly pushed into position within said socket piece by an upward movement and retained in place by a spring catch $j$. This catch is in the form of a spring arm having at its lower end a trigger like extremity and at its other end having a pivot piece $j^1$ (Fig. 15) engaging with a corresponding recess in the socket piece $C^2$. Near its lower end it also has an inclined nose $j^2$ for engagement with an inclined shoulder $j^3$ on the magazine whereby the latter is held firmly in place until released by the withdrawal of said incline nose from the shoulder $j^3$ by actuating the trigger like extremity of the catch. The magazine may be of any well-known and suitable construction. As the bolt G is retracted, the expended primer is withdrawn, and the spring controlled cartridge lifter $J^1$ of the magazine feeds a fresh primer into position in the well known manner. In Fig. 15, the lifter shown is that known as the Lee-Enfield pattern. As a means of calling attention to the exhaustion of the magazine, we may form in its sides and also in the sides of the socket piece, slots $j^4$ $j^4$ (Fig. 18) through which the number of primers in the magazine may be observed. In other respects this form of the mechanism is similar to that above described with reference to Figs. 1 to 14.

In the arrangement shown by Figs. 20 to 24, we have illustrated a mechanical device for actuating the releasing sear or trigger $c^{12}$ instead of an electro-magnet. For this purpose we mount on the swinging carrier A, a double bell-crank lever $c^{13}$ one member of which engages with an arm $c^{14}$ mounted on a shaft $c^{15}$ situated at or near the breech of the gun. The outer end of this shaft $c^{15}$ has formed on it a lever $c^{16}$ which may be engaged by a handle, rod, or trigger pull mounted on some non-recoiling part of the gun carriage. The arrangement of the double bell-crank lever $c^{13}$ with the shaft $c^{15}$ is such that the breech cannot be closed unless the said shaft is in its correct position, owing to the fact that the arm $c^{14}$ would then act as a stop to the inner member of the double bell crank lever $c^{13}$. The engagement of the lever $c^{16}$ of the shaft $c^{15}$ with the actuating part of the gun mounting is such that the gun is free to recoil together with the said shaft $c^{15}$ and cannot be fired until the gun is run out again to firing position, when said lever $c^{16}$ engages correctly with the firing handle or lever. When the said firing handle is pulled, it actuates the aforesaid shaft $c^{15}$, and the arm $c^{14}$ thereon in turn actuates the double bell crank lever $c^{13}$ of the carrier, whereby the arm $c^{17}$ will actuate the arm $c^{18}$ on the outer end of the axle $c^2$ and will thus release the trigger or firing sear $c^{12}$ of the lock. In other respects this mechanism is similar to that already hereinbefore described.

The firing lock shown in the accompanying drawings by way of example is like that set forth in the specification of Godsall's British patents Nos. 11461 of 1888 and 22003 of 1902, we wish it to be understood however that any other form or pattern of firing lock may be employed for instance that of the well known Mauser and Mannlicher.

What we claim and desire to secure by Letters Patent of the United States is:—

1. In breech loading ordnance, the combination with the breech mechanism, of a rifle bolt-lock, means for supplying thereto ordinary rifle cartridges without their bullets, and means for liberating the firing pin of said bolt-lock to fire the primer.

2. In breech loading ordnance, the combination with the breech mechanism, of a rifle bolt-lock, means for supplying thereto ordinary rifle cartridges without their bullets, and means for electrically liberating the firing pin of said bolt-lock to fire the primer.

3. In breech loading ordnance, the combination with the breech mechanism, of a rifle bolt-lock, means for automatically supplying thereto ordinary rifle cartridges without their bullets, and means for liberating the firing pin of said bolt-lock to fire the primer.

4. In breech loading ordnance, the combination with the breech mechanism of a rifle bolt-lock, means for automatically supplying thereto ordinary rifle cartridges without their bullets, and means for electrically liberating the firing pin of said bolt-lock to fire the primer.

5. In breech loading ordnance, the combination with the breech mechanism, of a rifle bolt-lock, means for supplying thereto ordinary rifle cartridges without their bullets, a sear for the firing pin of the bolt-lock, an armature connected with said firing sear, and electro-magnetic means for actuating said armature to release the firing sear for the purpose specified.

6. In breech loading ordnance, the combination with the breech-mechanism, of a rifle bolt-lock, means for supplying thereto ordinary rifle cartridges without their bullets, a sear for the firing pin of said bolt-lock, a pivoted spring controlled armature connected with said firing sear, and an electromagnet for actuating said armature to release the firing sear for the purpose specified.

7. In breech loading ordnance, the combination with the breech mechanism, of a rifle bolt-lock, a magazine for supplying thereto ordinary rifle cartridges without their bullets, and means for liberating the firing pin of said bolt-lock to fire the primer.

8. In breech loading ordnance, the combination with the breech mechanism, of a rifle bolt-lock, a magazine for supplying thereto ordinary rifle cartridges without their bullets, means for detachably connecting said magazine with the casing of the rifle bolt-lock, and means for liberating the firing pin to fire the primer.

9. In breech loading ordnance, the combination with the breech mechanism, of a rifle bolt-lock, a magazine for supplying thereto ordinary rifle cartridges without their bullets, a trigger-like catch for detachably connecting said magazine with the casing of the rifle bolt-lock, and means for liberating the firing pin of said bolt-lock to fire the primer.

10. In breech loading ordnance, the combination with the breech mechanism, of a rifle bolt-lock, means for supplying thereto ordinary rifle cartridges without their bullets, a sear for the firing pin of the bolt-lock, a spring controlled axle carrying said sear, an arm on said axle, and means for actuating said arm to release the firing sear for the purpose specified.

11. In breech loading ordnance the combination with the breech block, the swinging carrier and the mushroom stem; of a box-nut adapted to be detachably connected with the mushroom stem, a rifle bolt-lock carried by said box-nut, means for locking said box-nut to the obturator-bolt, means for supplying to the bolt-lock ordinary rifle cartridges without their bullets, and means for liberating the firing pin of the bolt-lock to fire the primer substantially as described.

12. In breech loading ordnance, the combination with the breech block, the swinging carrier and the mushroom stem; of a box-nut adapted to be detachably connected with the mushroom stem, a rifle bolt-lock carried by said box-nut, means for locking said box-nut to the obturator-bolt, a magazine for supplying to the bolt-lock ordinary rifle cartridges without their bullets, and means for liberating the firing pin of the bolt-lock to fire the primer substantially as described.

13. In breech loading ordnance, the combination with the breech-block, the swinging carrier and the mushroom stem; of a box-nut adapted to be detachably connected with the mushroom stem, a rifle bolt-lock carried by said box-nut, means for locking said box-nut to the obturator-bolt, a magazine detachably connected with the box-nut for supplying to the bolt-lock ordinary rifle cartridges without their bullets, and means for liberating the firing pin of the lock to fire the primer substantially as described.

14. In breech loading ordnance, the combination with the breech-block, the swinging carrier and the mushroom stem; of a box-nut adapted to be detachably connected with the mushroom stem, a rifle bolt-lock carried by said box-nut, a sliding safety piece mounted in said box-nut, means for actuating said safety piece by the movement of the breech actuating hand lever, means for supplying to the bolt-lock ordinary rifle cartridges without their bullets, and means for liberating the firing pin of the lock to fire the primer substantially as described.

15. In breech loading ordnance, the combination with the breech block, the swinging carrier and the mushroom stem; of a box-nut adapted to be detachably connected with the mushroom stem, a rearwardly extending casing on said box-nut, a bolt adapted to slide and turn in said casing, a spring controlled firing pin within said bolt, means for cocking said firing pin by the retraction of said bolt, a cartridge retractor carried by said bolt, a sear for retaining the firing pin in its cocked position, means for supplying to said bolt-casing ordinary rifle cartridges without their bullets, and means for releasing said sear to fire the primer substantially as described.

16. In breech loading ordnance, the combination with the breech block, the swinging carrier and the mushroom stem; of a box-nut adapted to be detachably connected with the mushroom stem, means for locking said box-nut to the mushroom stem, a rearwardly extending casing on said box-nut, a bolt adapted to slide and turn in said casing, a spring controlled firing pin within said bolt, means for cocking said firing pin by the retraction of said bolt, a cartridge extractor carried by said bolt, a sear for retaining the firing pin in its locked position, a magazine for supplying to said bolt casing ordinary rifle cartridges without their bullets, and means for releasing said sear to fire the primer substantially as described.

17. In breech loading ordnance, the combination with the breech block, the swinging carrier and the mushroom stem; of a box-nut adapted to be detachably connected with the mushroom stem, a safety slide on said box-nut for locking the latter to the mushroom stem, means for actuating said safety slide by the movement of the breech actuating hand-lever, a rearwardly extending casing on said box-nut, a breech bolt adapted to slide and turn in said casing, a spring controlled firing pin within said bolt, means for cocking said firing pin by the retraction of said bolt, a cartridge extractor carried by said bolt, a sear for retaining the firing pin in its cocked position, means for supplying to said bolt casing ordinary rifle cartridges without their bullets, and means for releasing said sear to fire the primer substantially as described.

18. In breech loading ordnance, the combination with the breech block, the swinging carrier and the mushroom stem; of a box-nut adapted to be detachably connected with the mushroom stem, a safety slide on said box-nut for locking the latter to the mushroom stem, means for actuating said safety slide by the movement of the breech actuating hand-lever, a rearwardly extending casing on said box-nut, a bolt adapted to slide and turn in said casing, a spring controlled firing pin within said bolt, means for cocking said firing pin by the retraction of said bolt, a cartridge extractor carried by said bolt, a sear for retaining the firing pin in its cocked position, a safety sear adapted to be operated by said safety slide for retaining the firing pin in its cocked position when said slide is removed from the box-nut, means for supplying to said bolt-casing ordinary rifle cartridges without their bullets, and means for releasing said firing sear to fire the primer substantially as described.

In testimony whereof we have hereunto set our hands in presence of two subscribing witnesses this twenty first day of December 1904.

ARTHUR TREVOR DAWSON.
GEORGE THOMAS BUCKHAM.

Witnesses:
HENRY KING,
ALFRED PEAKS.